Nov. 7, 1967   J. I. DETWEILER   3,350,979
CONTAMINATION FILTER MASK

Filed June 22, 1964   2 Sheets-Sheet 1

INVENTOR.
JAMES I. DETWEILER
BY George C. Sullivan
Agent

Nov. 7, 1967  J. I. DETWEILER  3,350,979
CONTAMINATION FILTER MASK
Filed June 22, 1964  2 Sheets-Sheet 2
Fig. 2
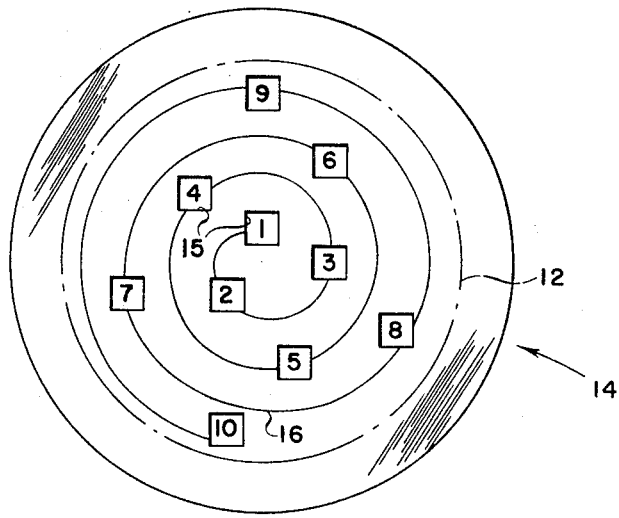
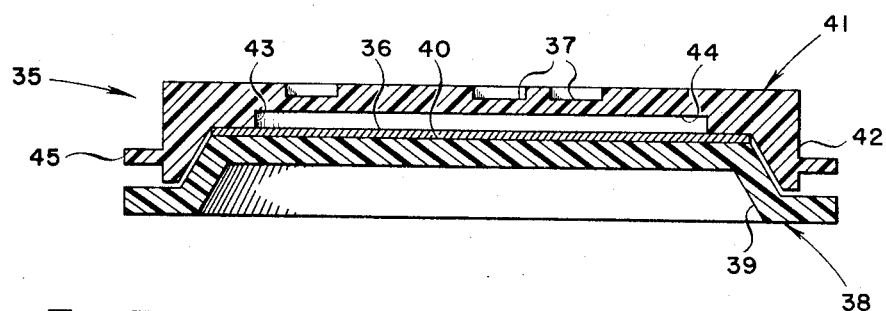
Fig. 5
INVENTOR.
JAMES I. DETWEILER
BY
George Sullivan
Agent

United States Patent Office 3,350,979
Patented Nov. 7, 1967

3,350,979
CONTAMINATION FILTER MASK
James I. Detweiler, Burbank, Calif., assignor to Lockheed
Aircraft Corporation, Burbank, Calif.
Filed June 22, 1964, Ser. No. 376,729
14 Claims. (Cl. 88—14)

ABSTRACT OF THE DISCLOSURE

A mask for fluid filters to enable particle counts to be taken rapidly and accurately. A disc-like mask is provided with a series of discretely and scientifically oriented cutouts adapted to expose complementary regions of an adjacent filter for visual inspection and for particle count purposes.

---

This invention relates to means for increasing accuracy in making contaminant particle counts on filter membranes. More particularly, it relates to a means and method for systematically selecting and isolating a random pattern of discrete areas on a fluid filter membrane for obtaining a rapid microscopic particle count reasonably representative of the total area of the membrane exposed to fluid flow.

Throughout the hydraulic industry it has long been the practice to determine particulate contamination of hydraulic fluid by the particle count method. In practicing the process hydraulic fluid is passed through specially prepared filter membranes under closely controlled conditions of cleanliness. For example, the procedure spelled out in the Society of Automotive Engineers, Inc. document ARP 598 entitled, "Procedure for the Determination of Particulate Contamination of Hydraulic Fluids by the Particle Count Method," is often used as a guide. The membranes intercept and retain contaminant particles thereby filtered from the fluid. Particles so trapped on the membrance surface are then systematically counted by means of a microscope to obtain an accurate determination of the extent of the hydraulic fluid contamination.

Much confusion has developed concerning the adequacy, accuracy and the value realized from making such particle counts. The accuracy of the particle count has always been problematical. Time consumption has also been a detrimental factor.

In order to eliminate the necessity for counting each particle over the entire surface of the filter membrane, the procedure of imprinting upon that surface a grid pattern to facilitate the counting of only a specified number of selected square areas has become a common practice. However, problems still arise in keeping track of such squares once such selection has been made, and in determining which of the specs or particles appearing on the filter surface between the grid lines is, in fact, a true contamination particle; this in view of the fact that the ink utilized in imprinting the grid sometimes has a tendency to migrate into the blank regions between the grid lines and to appear as contamination particles.

Additionally, one of the greatest weaknesses of past counting techniques has been the lack of means for methodically selecting the precise areas of the filter to be counted. Ideally, the contamination particles to be counted should be uniformly distributed over the entire surface of the filter, and the particular areas selected for counting should be inconsequential. Nevertheless, in actuality, the distribution of contaminant particles is never uniform. Therefore, consideration must be given to the proper selection of the regions to be counted.

Very time-consuming and costly techniques have been developed in an attempt to overcome the noted problems. Some laboratories have resorted to having the count repeated by the same or different technicians to obtain a count repeatability factor. In some cases, the counts of the technicians have varied by as much as 50 to 100 percent.

The selection of squares to be counted has usually been accomplished on an arbitrary basis, the squares not being truly representative of the entire surface.

It is an object of this invention to provide a means for rapidly and accurately selecting precise and scientifically determined areas upon the surface of a fluid filter disc within which particle counting can be achieved with optimum meaning.

Another object is to provide means whereby a predetermined number of squares upon the surface of a filter disc may be selected in a planned random distribution to provide a representative particle count reasonably representative of the entire disc surface exposed to fluid flow.

A further object is to provide a mask adapted to expose predetermined regions within the surface area of a fluid filter disc and wherein a separate set of non-overlapping areas to be counted may be quickly and accurately selected through the use of the same mask.

Still another object is to provide a means for permanently identifying individual squares counted on each filter disc.

Yet another object is to provide means in combination with a filter disc container for exposing through the container a series of predetermined surface areas upon the filter disc.

These and other objects of invention will become more apparent and be better understood when considered in view of the following specification and claims, taken with the drawings, wherein:

FIGURE 2 is a plan view of a mask indicating a layout approach for the exposed areas;

FIGURE 5 is a cross-sectional view of an alternative container embodiment.

Figure 1:
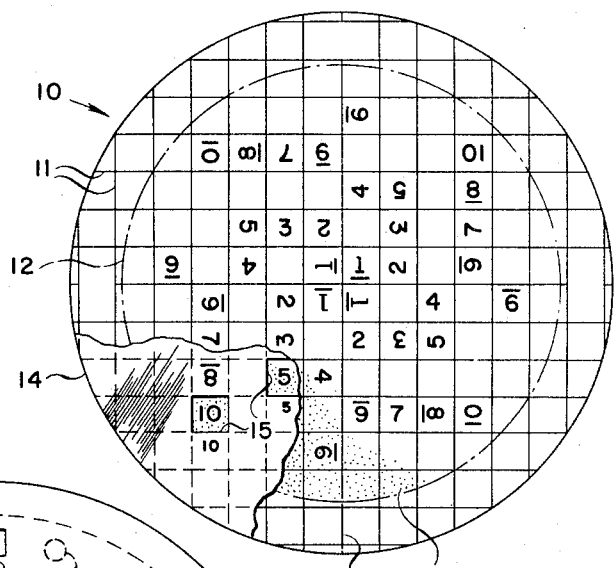
FIGURE 1 is a plan view of a typical grid type filter membrane having numerals disposed thereon for a purpose to be described.

In greater detail, FIGURE 1 shows a typical fluid filter membrane having a conventional grid pattern imprinted on its surface. Although such a grid type filter membrane is equally as usable in the practice of the present invention as is a filter membrane having a plain or non-grided surface and is shown in FIGURE 1 for illustrative purposes, it is sometimes preferable that a non-grided membrane be utilized. The possibility of ink migration with a resulting faulty particle count is thereby eliminated.

The filter membrane is generally indicated in the drawings by the numeral 10. The membrane is provided with grid lines 11 imprinted thereon to form a plurality of squares. When the membrane 10 is placed within a fluid conduit through which a fluid is passed for filtration purposes, it is usually covered by the conduit structure to approximately the location indicated by the phantom line 12, the area centrally thereof being exposed to the passing fluid. When so exposed, various particles of contaminant may be deposited upon the membrane surface. Such contaminant particles, illustrated only in a restricted area of the membrane 10 in FIGURE 1 for illustrative purposes and indicated by the numeral 13, may be counted by placing the membrane under a microscope and physically counting the total number of particles deposited.

As noted above, due to time and personnel fatigue considerations it is not generally desirable that the total number of particles appearing upon the membrane surface be counted. Rather, it is preferable that only a portion of the area be counted and that a suitable factor be utilized to calculate the total particle count. It is in the means for selection of such areas that the present invention resides.

Figure 3:
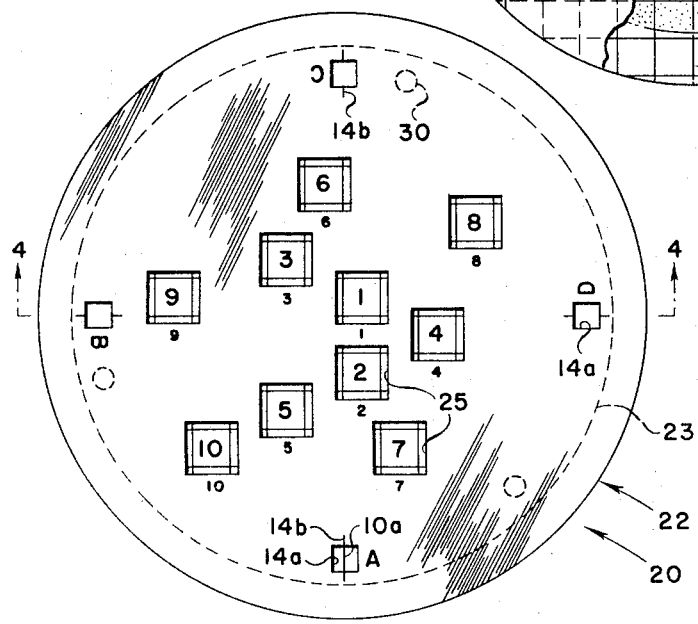
FIGURE 3 is a plan view of a petri dish type container for a filter membrane including mask means in a surface thereof.

In FIGURES 1-3 a series of numerals have been placed in certain of the filter membrane grid squares. These numerals are representative only and do not appear upon the actual filter membranes.

The numerals indicate the squares which are visible through the mask 14 of this invention when the mask is oriented in a particular relationship with respect to the membrane. The mask 14 of FIGURE 1 is shown only in cutaway section covering a portion of the membrane. A typical mask 14, comprising the means for particle count area selection, is fabricated from an appropriate material such as plastic or paper. It usually has a diameter equal to that of the filter membrane. It will become apparent, however, that the outer diameter is of no real consequence except for purposes of concentrically aligning the membrane and mask elements.

In accordance with this invention, the mask usually includes a series of windows 14a and identifying indicia for mutual alignment purposes, for example, the representatively illustrated letters A, B, C and D adjacent the viewing ports 14a in the mask of FIGURE 3, and the alignment marks 14b provided therewith. The filter membrane usually includes a single line 10a in the location of one of the alignment marks, suitably differentiated from grid lines when gridded filters are used. The marks 14b with the A indicia may then be aligned with the mark 10a upon the membrane to provide an initial reading. When so aligned, a series of cutouts, depressions or clear regions 15, usually referred to as windows, are oriented to permit viewing of certain regions therethrough. The windows are provided in an otherwise continuous, opaque, translucent, or colored surface of the mask 14, and specifically selected or planned in their orientation upon or through the surface of the mask 14. It is preferred that the window locations be planned as a "random" pattern. The illustrated mask exposes ten regions or squares, their "random" selection being planned to expose isolated areas representative of the complete area of the membrane 10 exposed to the fluid flow, the squares being distributed as uniformly as possible among all sectors or segments of the membrane. Furthermore, when the mask is rotated in 90° increments with respect to the membrane the random pattern should be planned such that then nonduplicating areas are exposed. The preferred random configuration, therefore, provides four sets of ten areas each, each set being completely representative of the total area of the membrane exposed to fluid flow, no area of one set duplicating the areas of any other set at any one of four mutually normal positions.

A representative embodiment of a random pattern is illustrated in FIGURE 1 wherein the mask 14, when oriented over the membrane 10 in the A position (see FIGURE 3 for representative indicia) exposes ten squares upon the surface of the membrane 10 through the scientifically disposed windows 15. Hence, the series of numerals 1 through 10 oriented such that they are readable in the same orientation as is the indicia A are exposed. Were the mask to be rotated clockwise 90° such that the mark adjacent the B indicia upon the mask 14 is oriented over the indicia mark upon the filter membrane 10, a second set of numerals 1 through 10 readable in FIGURE 1 in the same orientation as the A indicia of the mask would then be exposed through the windows 15. Repetition of this procedure such that the indicia C or D of the mask 14 became positioned over the indicia mark of the filter membrane 10 in further incremental rotations, causes new sets of numerals 1 through 10 to be exposed, in each case the numerals being readable from the A indicia of the mask. Were particle counts taken in each of the various positions, four separate sets of values with no redundancy in particle countings would then be available for comparative purposes.

Small numerals such as those illustrated upon the mask 14 adjacent the windows 15 in FIGURES 1 and 3 are sometimes provided for identifying the various windows in a specific mask configuration.

It is generally preferable that the window or cutout pattern be fairly representative of the filter membrane area in a radial sense; i.e., the individual squares chosen should be at different distances from the center of the filter membrane and cover a relatively large area with respect to the central portion of the membrane. It is apparent that the radial distance between the mean centers of squares No. 1 and 2, although a portion of the squares may radially (but not in fact) overlap, should be greater than the radial distance between the mean centers of the squares No. 2 and 3. In general, this holds true for the radial distances between each of the progressively increasing numbers. The radial distance between the squares 9 and 10 should, then, be the smallest of the radial distances between any two immediately progressive numbers. This consideration is of great importance since unskillful application of techniques prescribed for producing the specimen membrane may result in a circular pattern of particle distribution. A predominance of counts made in high density or low density rings would produce gross errors in calculated contamination levels. It also provides a more representative sampling of total available sampling area.

The illustration of FIGURE 2 clearly indicates the general relationship of the various windows of a second pattern of a typical mask 14. The spiral line connecting the numbers which are progressively larger from the inner to the outer extremities of the spiral graphically illustrates the fact that no window 15 exactly duplicates any other window in its radial distance from the center of the mask. The spiral pattern 16 is illustrative only and is not intended to be a true spiral, the exact configuration thereof being somewhat dependent upon the ability of the designer to locate the squares or cutouts such that no region thereof is duplicated by any other cutout when the mask is rotated a predetermined amount.

Figure 4:
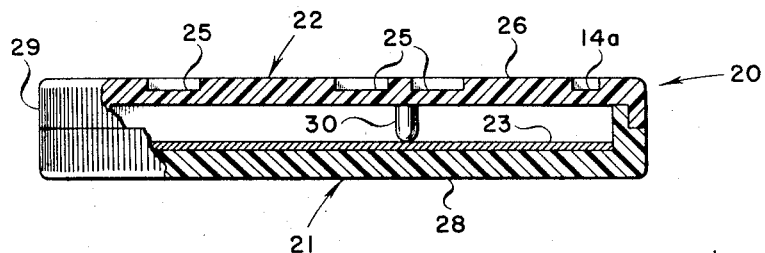
FIGURE 4 is a view of the filter membrane container of FIGURE 3, taken along line 4—4.

FIGURES 3 and 4 are representative of a container 20 of the petri dish type. The container 20 includes a filter-receiving portion 21 and a lid 22. While the filter receiving portion may be of a conventional construction, it is preferable that the internal height of the container 20 be only sufficient to provide clearance above the filter elements. This will assure that filters such as that indicated by the numeral 23, when placed therein, will be located as closely as possible to the lid. The lid 22 includes a plurality of windows 25 which are adapted to expose a plurality of areas of the filters 23, positioned within the container 20, in substantially the same fashion as described with respect to the mask 14.

Although the container 20 may be fabricated from any convenient material, it is generally preferable that a plastic be utilized and that an appropriate means to distinguish the windows 25 from the balance of the lid surface be provided. In some instances the window regions 25 are recessed within the lid 22 to provide the necessary differentiation. The upper surface 26 of the lid 22 may also be made translucent by a suitable roughening or color application technique alternative to or in addition to the use of recessed window concept. The windows 25 are sometimes of the same dimension as the areas to be actually counted. Alternatively, they may be greater in size than the areas to be counted, such as illustrated in FIGURE 3. Therein the windows 25 extend beyond the grid lines imprinted upon the surface of the filter membrane 23. Hence, using the alternative approaches, (1) particle counts may be made directly through the windows 25 utilizing the windows proper as the count boundaries, or (2) when grid lines are provided upon certain of the filter membranes and exposed through the windows 25, the grid lines proper are utilized as the boundaries. In the latter event the windows serve primarily to isolate the grid squares to be counted and to thereby eliminate the possibility of error by the counter in switching squares during the counting procedure. Such oversized windows are desirable under many conditions to prevent shadows from falling upon the particle count areas, particularly when light must be admitted to the work area at an angle with respect to the work area.

It is usually desirable that a friction means such as the serrations 29 upon the outer periphery of the lid 22 be provided on one or both the lid 22 and the filter-receiving portion 21 to facilitate turning of the lid 22 with respect to the filter-receiving portion 21 and to thereby obtain a plurality of sets of representative particle counts. Orientation means such as described with respect to FIGURE 1 may be utilized for this purpose. A lip on either or both the upper and lower halves may also be used to assist in lid removal.

It will be apparent that windows 25 can be provided on the lower surface 28 of the filter-receiving portion 21. In such case, the contaminant containing surface of the filter membrane 23 is placed flush against the internal surface of the bottom of the filter-receiving portion. This provides a closer contact for obtaining greater count accuracy, particularly where the non-grid type filter membranes are utilized. Extension means 30 are sometimes provided on the internal surface of the lid 22 in the form of integral posts or other similar structure to contact the filter membranes 23 and maintain their contact with the bottom of the filter-receiving portion 21. Springs retained on the upper surface of the lid 22 are sometimes also used for this purpose.

It will be understood that while the specific window layout pattern utilized is of some significance in obtaining count accuracy, it is not critical to the invention and patterns other than those illustrated may be utilized without departing from the intended scope of the invention.

The container 35 of FIGURE 5 provides a means whereby a filter membrane 36 may be positioned therein for accurate microscopic inspection of the contaminant particles through the windows 37.

A base portion 38 includes an upwardly extending section 39 in the general form of a truncated cone or other appropriate shape. The diameter of its upper surface 40 is usually the same as that of the filter membrane.

A cover portion 41 includes a flange 42 shaped to nest over the section 39 and having a hold-down ring surface 43. The surface 43 has an outer diameter substantially matching that of the surface 40 and the filter membrane 36. Its inner diameter is preferably, though not mandatorily, that of the filter membrane exposed to fluid flow. The structure defined therebetween acts to contact and retain the position of the filter membrane when the container portions are fully engaged. The inner surface of the cover 41 includes a shallow recess 44 defining the aforementioned inner diameter. The recess 44 provides a clearance between the cover 41 and the contaminant particle-containing surface of the filter membrane 36. Tab means 45, or other similar means, may be provided for separating or relatively turning the two container portions.

Through the use of this invention a high degree of particle count accuracy with a minimum of time expenditure may be accomplished.

Because of the nature of this invention, and the fact that various minor changes falling within the scope of routine engineering skill may be made in the mask described herein, the spirit and scope of the invention itself is to be considered as being limited solely by the appended claims forming a part of this disclosure.

I claim:

1. A fluid filter mask comprising:
    a cover member at least substantially coextensive with the area of a filter membrane adapted for exposure to fluid flow; and
    window means in said cover member for exposing only predetermined restricted regions of the filter substantially representative of the total filter membrane area.

2. The fluid filter mask of claim 1 wherein said mask comprises a flat disc-like member and wherein said window means is a plurality of cutouts disposed in a scientifically planned random pattern.

3. The fluid filter mask of claim 1 wherein said window means comprises a plurality of discrete regions in said mask through which similar discrete regions of the filter membrane located thereunder may be viewed.

4. The fluid filter mask of claim 3 wherein said windows are adapted to admit sufficient light to all regions of the filter membrane upon which contamination particles are to be counted to facilitate an accurate count.

5. The fluid filter mask of claim 3 wherein said windows over-extend the boundaries of the regions to be counted upon the filter membranes an amount sufficient to permit free access of light to the count region of the filter membrane.

6. The fluid filter mask of claim 3 further including indicia upon said mask adapted for alignment with indicia upon the fluid filter membrane for obtaining multiple sets of particle counts, said window means being oriented in said mask such that a 90 degree rotation of said mask with respect to the fluid filter exposes new fluid filter areas without redundancy.

7. The fluid filter mask of claim 1 wherein said cover member is the lid of a fluid filter container and said window means are transparent regions defined in said lid and distinguishable from the remainder of said lid.

8. The fluid filter mask of claim 7 wherein said window means comprise means defining recesses in an outer surface of said lid, the remaining material under said recesses being transparent.

9. The fluid filter mask of claim 1 wherein said window means is a plurality of discrete transparent areas in the bottom of a filter container, said filter including a lid having extension means thereon for pressing against and retaining a fluid filter membrane against and with respect to the bottom of said container.

10. A contaminant filter mask comprising a mask adapted to cover a filter membrane to be inspected, means in said mask comprising a plurality of windows, said windows being located to expose representative areas of a surface of the filter membrane such that contaminant particle counts of said exposed areas may be accomplished and such that the remainder of the filter membrane surface is covered by said mask.

11. The contaminant filter mask of claim 10 wherein the said structure defining said windows is closely spaced from the surface of the filter membrane upon which contaminant particles are deposited.

12. A contaminant filter container and mask combination comprising:
    first and second container portions adapted to be mutually nested and to reecive a filter membrane therebetween; and means in one of said portions defining a plurality of windows suitably located to expose predetermined regions of the filter membrane in a pattern substantially representative of the total area of the filter membrane.

13. The contaminant filter container and mask combination of claim 12 wherein said portion including said window means is recessed on an inside surface thereof to prevent structural contact between that said portion and the surface of the filter membrane adapted to have contaminant particles deposited thereon.

14. The contaminant filter container of claim 13 wherein means is provided in said container to contact and retain the position of the filter membrane when said container portions are mutually engaged.

References Cited

UNITED STATES PATENTS

| | | | |
|---|---|---|---|
| 2,495,912 | 1/1950 | Wood | 88—14 |
| 3,009,388 | 11/1961 | Polanyi | 88—14 |
| 3,236,095 | 2/1966 | Gelder | 73—61 |

OTHER REFERENCES

"Procedure For the Determination of Particulate Contamination of Hydraulic Fluids by the Particle Count Method," Society of Automotive Engineers, Inc., ARP 598, issued Mar. 1, 1960, New York, pages 1, 2 and 7–10.

SAMIH N. ZAHARNA, *Primary Examiner.*